United States Patent [19]

Moore et al.

[11] 4,196,307

[45] Apr. 1, 1980

[54] MARINE UMBILICAL CABLE

[75] Inventors: Boyd B. Moore; Clarence E. Kendall, Jr., both of Houston, Tex.

[73] Assignee: Custom Cable Company, Houston, Tex.

[21] Appl. No.: 804,422

[22] Filed: Jun. 7, 1977

[51] Int. Cl.[2] .......................... H01B 7/14; H02G 9/12

[52] U.S. Cl. ........................................ 174/47; 57/221; 174/70 R; 174/116; 174/131 A

[58] Field of Search ........... 174/47, 70 R, 116, 131 A, 174/113 C; 57/145, 146, 147, 148, 149

[56] References Cited

U.S. PATENT DOCUMENTS

| | | | |
|---|---|---|---|
| 3,309,861 | 3/1967 | Pierson et al. | 57/149 X |
| 3,526,086 | 9/1970 | Morgan | 57/149 |
| 3,681,911 | 8/1972 | Humphries | 57/149 |
| 3,710,006 | 1/1973 | Davis | 174/113 C X |
| 3,766,307 | 10/1973 | Andrews, Jr. | 174/47 |
| 3,800,522 | 4/1974 | Hughes et al. | 57/149 |
| 3,823,253 | 7/1974 | Walters et al. | 174/113 C |
| 3,874,158 | 4/1975 | Chiappetta et al. | 57/149 |
| 3,911,785 | 10/1975 | Hood | 57/149 |
| 3,960,050 | 6/1976 | Eisler | 57/164 |
| 4,022,010 | 5/1977 | Gladenbeck et al. | 57/149 |
| 4,059,951 | 11/1977 | Roe | 57/149 |

FOREIGN PATENT DOCUMENTS

| | | | |
|---|---|---|---|
| 577152 | 5/1946 | United Kingdom | 174/70 |

*Primary Examiner*—Thomas J. Kozma

*Attorney, Agent, or Firm*—Fulbright & Jaworski

[57] ABSTRACT

A unitized marine umbilical cable carrying any number or combination of conventional elements such as hoses and electrical cables. A center stress member disposed along the axis of the marine umbilical cable is capable of supporting an underwater device such as a diving bell should the primary down line break. Cylindrically surrounding the stress member is a compression extrusion of a high strength highly resilient elastomer around which are helically cabled various conventional elements. Within the interstices between the high strength elastomer and the helically cabled elements is a resilient fill material. The resilient fill material and high strength highly resilient, low durometer elastomer serve as a radial shock absorber against tensional impact upon the umbilical or radial forces thereupon.

9 Claims, 6 Drawing Figures

Fig. 1
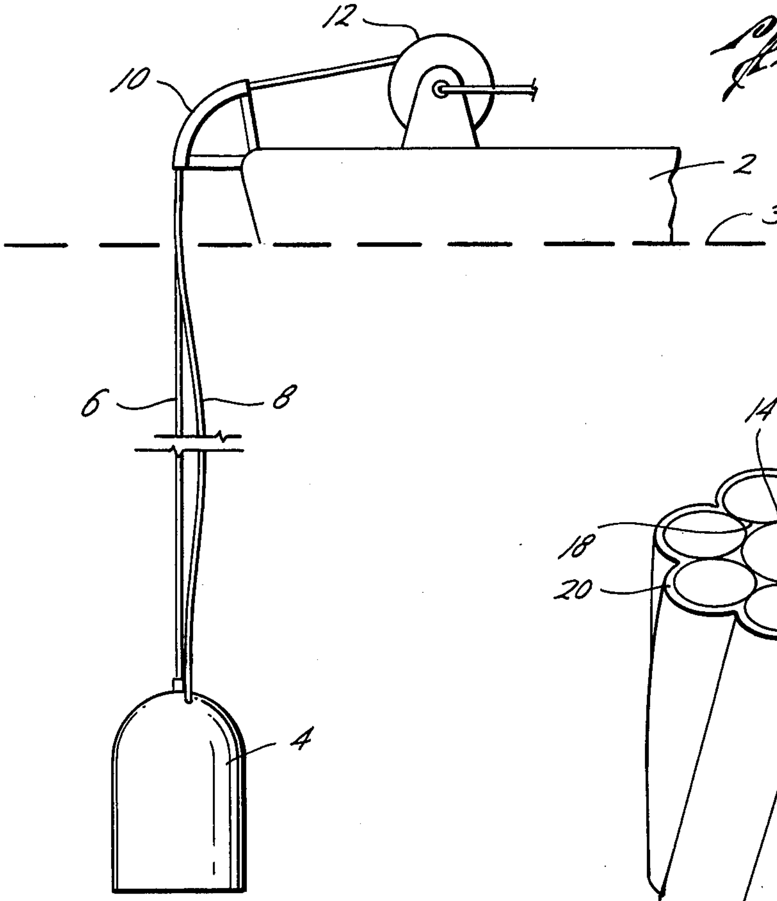
Fig. 2
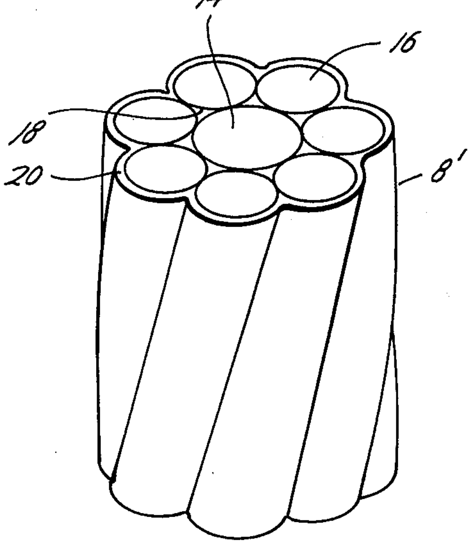
Fig. 3
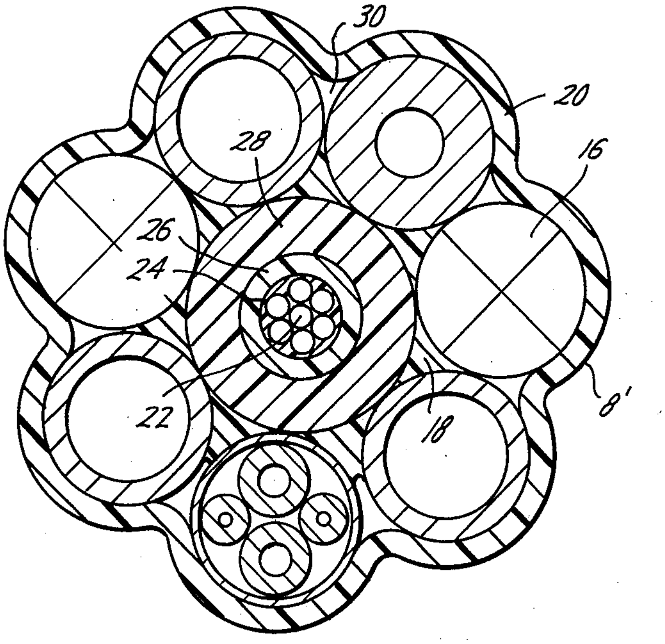
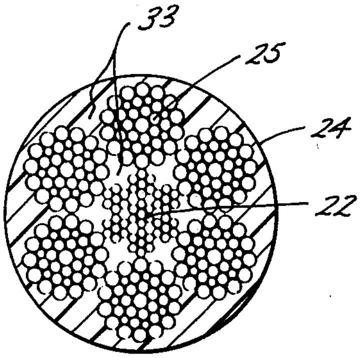
Fig. 4

MARINE UMBILICAL CABLE

STATEMENT OF THE PRIOR ART

In underwater operations, particularly those involving a diving bell or any similar apparatus, it is necessary to provide by means of cables and hoses (often termed "elements" or "Conduits") all means necessary to support and operate the bell. Furthermore, as a matter of safety it is necessary to provide a backup load bearing line capable of supporting the bell should the primary "down line" break. A conventional way of meeting the aforementioned requirements has been to wrap helically a load bearing member with any necessary elements and then joining same by hand taping them together. This procedure is ineffective because the cables as well as the load bearing member share the load of the bell upon breaking of the down line, thereby stretching and breaking the elements themselves. Moreover, frequent retaping has been required in order to secure the combination of the load bearing member and elements, thereby requiring unnecessary expenditure of time and money.

Another approach has been an attempt to unitize the elements within a protective jacket. Such attempts have been ineffective because once again all the elements are helically wound within the jacket and are subject to supporting the load of the bell upon fracture of the down line. Because these helically arranged elements are cabled under tension, upon release of that tension many of these elements are subject to axial contraction thereby causing "Z kinking," a phenomenon of metal wire wherein the load per unit caused by unloading the wire causes a point displacement resulting in a figure similar to a "Z." Past attempts at unitized marine umbilicals have not allowed for repair of the interior thereof.

Applicant is aware of U.S. Pat. No. 1,880,060 of Sept. 27, 1932 to Wanamaker disclosing a deep sea telephone, life line and diving cable having a centrally disposed wire rope stress member, a cushioning member entirely unlike that of the present invention, a yielding wrapping thereround, the presence of yielding spacer elements as well as the requirement for cables relatively smaller in size to that of the centered life line.

Applicant is also aware of U.S. Pat. Nos. 1,305,247 of June 3, 1919 to Beaver, 3,517,110 of June 23, 1970 to Morgan, 2,910,524 of Oct. 27, 1959 to Schaffhauser which disclose neither apparatus similar to that of the present invention nor propose to solve the problems resolved by the present invention.

SUMMARY OF INVENTION

The present invention relates to a unitized marine umbilical cable able to withstand the tensional impact resulting from a sudden tensional load placed upon the umbilical cable such as that caused by the break of the primary down line while at the same time supplying all necessary elements to, for example, a diving bell, for purposes of life support, television operation, electrical supply and the like. Moreover, the present invention relates to a unitized marine umbilical cable possessing the aforementioned capabilities while retaining sufficient flexibility for disposition around a reel, over a conveyor or sheave, as well as permitting easy repair or replacement of the internal elements thereof.

It is therefore a primary object of the present invention to provide a marine umbilical cable sufficient to withstand the tensional impact of a sinking diving bell and of continued support of the diving bell while reeling it to the surface.

Another object of the present invention is to have a unitized marine umbilical cable carrying not only a stress member but all necessary elements for operation and life support of the diving bell therein.

Yet another object of the present invention is the disposition of a high strength, highly resilient, low durometer elastomer material around the stress member thereby acting as a radial shock absorber against objects radially impacting the umbilical and tensional impact in the vertical part of the marine umbilical which is partially converted into radial impact at those points where the umbilical is substantially horizontal, to-wit, where the umbilical is disposed horizontally over a conveyor or sheave and circularly around a reel.

Still another object of the present invention is helically to dispose a combination of elements around the stress member whereby the stress member carries the entire impact and load of the diving bell thereby preventing the helically cabled elements from unwinding or breaking.

An even further object of the present invention is the extrusion of an exterior polyurethane jacket around the umbilical thereby facilitating easy and economic removal of the jacket for purposes of repair or replacement as necessary of one or more elements therein.

Still further objects of the invention will become apparent in the following specification, drawings, descriptions, and claims.

BRIEF DESCRIPTION OF THE DRAWINGS

FIG. 1 is an environmental view depicting a surface support ship, an underwater diving bell, a primary down line supporting the bell from the surface ship, a marine umbilical cable tethering the diving bell to the surface ship and being slackened relative to the primary down line, a conveyor or sheave for guidingly facilitating the raising or lowering of the marine umbilical cable, a reel means for raising or lowering the umbilical cable, and a separate sheave and reel means for guiding and driving the primary down line not shown in the drawing.

FIG. 2 is an isometric view of the helical exterior embodiment of the invention irrespective of the particular type core.

FIG. 3 is a cross sectional view of FIG. 2 disclosing a diagrammatical representation of a wire rope center stress member, a surrounding low melt temperature high strength plastic jacket compression extruded onto the wire rope, an internal polyurethane jacket extruded onto the plastic jacket, a high strength, highly resilient, low durometer elastomer material compression extruded onto the internal polyurethane jacket, any number of conventional elements helically disposed around the core, a resilient fill material disposed within the internal interstices between the elements and the core, a polyurethane jacket tube extruded onto the exterior of the helically disposed elements and unfilled external interstices between the helically disposed elements and external polyurethane jacket which have been enlarged in the drawing for purposes of description only.

FIG. 4 is a diagrammatical representation of any flexible, high load bearing wire rope, this particular diagram showing by example a 6×36 Warrington Seale with independent wire rope center.

DESCRIPTION OF THE PREFERRED EMBODIMENTS

Figure 5:
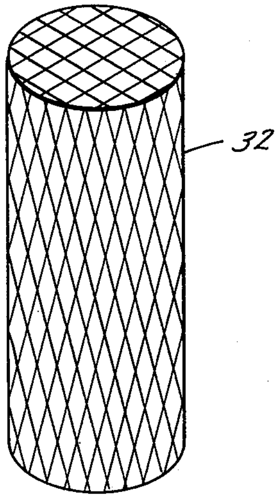
FIG. 5 represents an alternate stress member shown as an aramid fiber.

While the embodiments of the marine umbilical cable illustrated in the drawings and described in detail herein are directed for use primarily in maintaining while capable of supporting an underwater device such as but not limited to a diving bell, it is understood that the present device is equally suitable for any environment having a calling for a unitized umbilical cable supporting and maintaining any object or device requiring same.

Referring now to the drawings, reference character 4 represents a diving bell or any similar device requiring both physical support by tether means as well as life support. Reference character 2 depicts a surface ship floating on water level 3. Reference character 6 represents a primary down line supporting the bell 4 by tether means to surface ship 2 by passing the primary down line 6 over a conveyor or sheave 10 and thence onto and around reel means 12, the conveyor or sheave 10 and reel means 12 both being affixed to the ship 2, and being separate from the conveyor or sheave and reel means of the umbilical cable.

It should be noted that during normal operation the primary down line 6 supports the load of the bell 4 while the marine unbilical cable 8 connects the bell 4 to the ship 2 but remains unloaded. Upon breaking of the primary down line 6, the bell 4 will drop a certain distance necessary to take up the slack of the umbilical cable 8. Because of the dropping effect of the bell 4, umbilical cable 8 is first subjected to tensional impact along the vertical segment of the umbilical cable lying between the bell 4 and the sheave 10. Those skilled in the art will realize that a swelling sea raising the ship 2 relative to bell 4 will likewise cause tensional impact upon the umbilical 8 if the primary down line is broken. That part of the marine umbilical cable 8 disposed on and between the sheave 10 and the reel means 12 is substantially horizontal; therefore some of the impact and load produced by the falling bell 4 or the rising ship 2 on the umbilical cable 8 is radial as well as tensional on the upper portion of the sheave 10 as well as around the reel means 12. Consequently, any radial resiliency within the marine umbilical cable 8 and disposed upon the sheave 10 and the reel 12 tends to act as a radial shock absorber against the tensional impact of umbilical cable 8.

Similarly, a direct radial impact or load upon the umbilical 8 is cushioned by the resilient material 28, preferably a high strength, highly resilient, low durometer material, tending to prevent damage to the stress member 22 and elements 16.

FIG. 2 shows a particular mode of the marine umbilcal cable 8 having an exterior conforming to the helically cabled elements 16. FIG. 2 illustrates a core 14, one form of which is shown in FIG. 3 as comprising a wire rope stress member 22, a low melt temperature high strength plastic jacket 24 compression extruded onto wire rope stress member 22, an inner polyurethane jacket 26 extruded onto the jacketed stress member 22, 24 and a high strength, highly resilient, low durometer elastomer material 28 compression extruded onto the inner polyurethane jacket 26.

Figure 6:
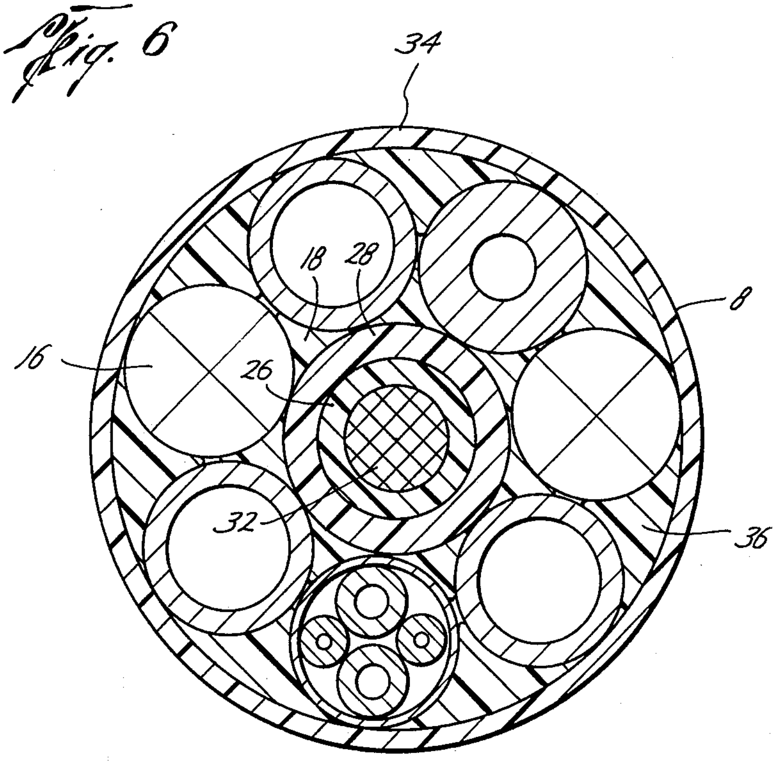
FIG. 6 is a cross sectional view of a marine umbilical cable having a stress member as shown in FIG. 5, an interior polyurethane jacket extruded onto the stress member, a high strength, highly resilient, low durometer elastomer material compression extruded onto the internal polyurethane jacket, helically disposed elements thereround, a resilient fill material in the internal interstices between the helical elements and the core, a substantially cylindrical exterior polyurethane jacket extruded onto the helically disposed elements and a conforming fill material disposed within the external interstices between the elements and the exterior polyurethane jacket.

Another embodiment of the core 14 is shown in FIG. 6 as having an aramid fiber stress member 32, a polyurethane inner jacket 26 extruded onto stress member 32 and a high strength, highly reslient, low durometer elastomer material 28 compression extruded onto the inner jacket 26. It will be recognized by those skilled in the art that either embodiment of the core 14 is appropriate for a marine umbilical cable having a helical exterior 8′ or cylindrical exterior 8.

Referring again to FIG. 6, the stress member 32 is laid axially to the cylindrical surface 8 of the marine umbilical. Because conventional elements 16 are helically cabled around the core 14, the stress member 32 is the shortest member per unit length of the marine umbilical 8 or 8′ thereby being the first to assume any tensional load applied thereto; hence, the stress member 32, having sufficient load bearing characteristics for the particular tensional load to be applied, will not elongate sufficiently to cause elongation of the conventional elements 16, which are non-load bearing elements, or unwinding of the elements 16 and breakage thereof.

As previously noted, the inner polyurethane jacket 26 is extruded onto the stress member 32. The inner jacket 26 produces a transitional effect between stress member 32 which is substantially incompressible and the highly resilient, high strength, low durometer material 28. The inner jacket 26, tending to project the area of the stress member 22 or 32 bearing upon the high strength, highly resilient, low durometer elastomer 28, has reasonably high strength characteristics while at the same time possessing a noticeable degree of resiliency. The elastomer material 28, however, is a non-load bearing material which is highly resilient. Consequently, when radial loads are applied to the marine umbilical cable 8 or 8′, the high strength elastomer 28 tends evenly to distribute that radial load. Resilient fill material 18 is injected as a high viscosity liquid during the cabling process into the internal interstices between the core 14 and conventional elements 16 and assists the elastomer material 28 in distributing a radial load applied to the marine umbilical 8 or 8′.

Turning now to FIG. 3, a preferred embodiment of the core 14 is shown as having a wire rope stress member 24. The particular wire rope used will vary according to the amount of load and impact expected to be applied to the umbilical 8 by the bell 4. A wire rope comprises an excellent stress member 22 in that it is both load bearing and flexible. One configuration of the wire rope 22 which is shown for purposes of illustration only, is a 6×36 Warrington Seale with independent wire rope center shown in FIG. 4. Interstices 33 as well as the individual wires comprising the wire rope stress member 22 generally come from the manufacturer with a lubricant thereupon which reduces galling of the wire rope 22 during repeated flexion thereof.

A low melt temperature high strength plastic jacket 24 of 0.005 inches minimum thickness is compression extruded onto the wire rope stress member 22, thereby inhibiting corrosion by salt water of the wire rope 22 and preventing bubbling of the inner jacket 26 by contact with a lubricant on wire rope 22.

Because the wire rope embodiment of stress member 22 is substantially less compressible than the stress member 32, the inner polyurethane jacket 26 even more importantly provides a transitional effect between the imcompressible stress member 22 and the highly resilient, high strength, low durometer elastomer 28. Because a wire rope stress member 22 has elongation characteristics of approximately one third of that of aramid fiber stress member 32, the cross sectional area of stress member 22 need be only approximately one third that of stress member 32. Consequently, because the inner polyurethane jacket is of approximate equal thickness for either embodiment of the core 14, preferably being at least 0.050 inches thick, the elastomer material 28 will vary according to the particular stress member utilized, thereby occupying a greater area of the core 14 when the wire rope stress member 22 is utilized and less of the core 14 when the aramid fiber stress member 32 is employed.

The external polyurethane jacket 20 is tube extruded as shown in FIGS. 2 and 3 onto the exterior of elements 16, and may be either tube or compression extruded as shown in FIG. 6. The embodiment shown in FIGS. 2 and 3 shows minute unfilled areas 30 in the external interstices between the surfaces of elements 16 and the external polyurethane jacket 20. It is understood that for purposes of representation only, the unfilled areas 30 are greatly enlarged in the drawings. These unfilled areas 30 must necessarily remain small in order to avoid undue stress on the jacket 20 caused by underwater pressures.

The jacket 20 may be economically removed for purposes of repair or replacement of the elements 16 and then a new jacket 20 extruded thereupon. An advantage of the helical configuration shown in FIGS. 2 and 3 of surface 8′ is a reduction in the overall weight of the umbilical 8′ resulting from the conforming of the jacket 20 approximately to the helices produced by the elements 16 as well as the unfilled external interstices 30. Furthermore, because all underwater lines are preferably black or of a substantially dark color in order to avoid attraction of sharks thereby prohibiting color coding, the rope configuration 8′ is easily identifiable both onboard ship 2 where many lines may be in proximity to each other as well as underwater. Moreover, it is easier to grip the umbilical cable 8′ than it is to grip the umbilical cable 8.

In some applications high radial loading upon the umbilical cable 8′ disposed around the reel 12 or the sheave 10 may cause distortion of the helical configuration 8′. Consequently, it is more desirable to use a cylindrical embodiment 8 as shown in FIG. 6. Accordingly, a conforming fill material is disposed within the external interstices 36 between the elements 16 and the cylindrical polyurethane external jacket 34 thereby tending to support the elements 16 and to distribute radial loads applied to the umbilical 8. In any event, it will be recognized that the maximum effective diameter of the helical configuration 8′ is equal to that of the cylindrical configuration 8. The cylindrical umbilical 8 remains easily and economically repairable in the manner described for configuration 8′.

Referring again to the core 14, those skilled in the art will easily recognize that the aramid fiber stress member 32 is non-corrosive and somewhat more elastic than the wire rope stress member 22, thereby necessitating less elastomer material 28 and thereby causing the diameter of the core 14 carrying the stress member 32 to be identical in diameter to the core 14 carrying stress member 22.

A preferred embodiment of the marine umbilical cable 8′ comprises a wire rope center 22, a polyethylene jacket 24 of 0.005 inches or more in thickness compression extruded onto the wire rope stress member 22, a lubricant on and within wire rope 22, an inner-polyurethane jacket 26 compression extruded onto the polyethylene jacket, a high strength, highly resilient, low durometer elastomer 28 in the range of 2800–6000 P.S.I. tensile strength, 300–800% elongation and 50–80 durometer respectively an example of which is marketed under the trademark ROYALAR E-80 owned by Uniroyal, compression extruded onto the inner-polyurethane jacket 26, elements 16 helically cabled thereround, a resilient fill material located within internal interstices 18, and a polyurethane jacket 20 tube extruded around elements 16 without completely filling external interstices 30 and which is easily removable for economic repair of cable 8′.

An additional preferred embodiment is shown in FIG. 6. An aramid fiber stress member 32 marketed under the registered trademark of Kevlar owned by Du Pont is surrounded by a polyurethane jacket extruded thereupon. A high strength, highly resilient, low durometer elastomer 28 described above acts as a shock absorber against radial loading and is compression extruded onto the internal polyurethane jacket. The helically cabled elements 16 define internal interstices 18 carrying a resilient fill material. An external polyurethane jacket 34, being substantially cylindrical in shape, tangentially encircles the helically cabled elements 16 and the conforming fill material in the external interstices 36 tends to support the elements 16 and to distribute uniformly radial loading.

While the presently preferred embodiments of the invention have been given for the purposes of disclosure, changes may be made therein which are within the spirit of the invention as defined by the scope of the appended claims.

What is claimed is:

1. A marine umbilical cable permitting support of an underwater device and carrying conduits to said device, comprising:

(a) a stress member disposed axially along the umbilical cord;

(b) an inner polyurethane jacket extruded onto the stress member of Step (a);

(c) a high strength, highly resilient, low durometer elastomer material, cylindrically extruded onto the jacket, said resilient material thereby tending to distribute evenly radial loading upon the umbilical cable resulting from disposing the umbilical cable around a reel, over a conveyor or sheave;

(d) conventional elements helically cabled around the extruded resilient material (c);

(e) a resilient fill material injected during the cabling process into the internal interstices formed between the exterior surface of the extruded resilient material (c) and the surfaces of the helically cabled elements (d); and (f) a jacket extruded onto the exterior of the combined apparatus of (a) through (e).

2. A marine umbilical cable permitting support of an underwater device and carrying all necessary conduits to the device comprising:

(a) a wire rope stress member substantially disposed along the axis of the umbilical cable;

(b) a low melt temperature high strength plastic jacket compression extruded onto the exterior and into the outer interstitial area throughout the length of wire rope;

(c) an inner polyurethane jacket extruded onto the low melt temperature plastic jacket thereby producing a transitional effect between the substantially incompressible wire rope center and a high strength, highly resilient, low durometer elastomer disposed contiguous to the exterior surface of the polyurethane jacket;

(d) a high strength, highly resilient, low durometer elastomer material extruded onto the inner polyurethane jacket thereby providing a shock absorber effect against radial forces on the umbilical;

(e) conventional elements helically cabled around the elastomer of (d);

(f) a resilient fill material injected during the cabling process into the interstices formed between the exterior surface of the high strength, highly resilient, low durometer elastomer material of (d) and the surfaces of the helically cabled elements; and (g) an external jacket extruded therearound thereby permitting easy removal of the exterior jacket, repair or replacement of the helically cabled elements.

3. The apparatus in claim 2 wherein the external jacket is polyurethane.

4. The apparatus in claim 2 wherein the wire rope stress member of Step (a) carries a lubricant within the interstices of the wire.

5. The apparatus in claim 2 wherein the low melt temperature high strength plastic jacket of Step (b) is polyethylene.

6. The apparatus in claim 2 wherein a conforming fill material is disposed within the external interstices between the surfaces of the helically cabled elements and the internal surface of the exterior jacket thereby increasing support of the helically cabled elements and more evenly distributing radial loads upon the umbilical cable.

7. A marine umbilical cable permitting support of an underwater device and carrying all the necessary conduits to the device comprising:

(a) an aramid fiber stress member substantially disposed along the axis of the umbilical cable;

(b) an inner polyurethane jacket compression extruded onto the stress member in Step (a);

(c) a high strength, highly resilient, low durometer elastomer material compression extruded onto the inner polyurethane jacket thereby providing a shock absorber effect against radial loads upon the umbilical cable;

(d) conventional elements helically cabled around the elastomer material of (c); and (e) an exterior polyurethane jacket tube extruded onto the helically cabled elements.

8. The apparatus in claim 7 wherein a conforming fill material is disposed in the interstices between the surfaces of the helically cabled elements and the external polyurethane jacket thereby making the exterior surface of the marine umbilical cable substantially cylindrical.

9. The apparatus in claim 8 wherein the external polyurethane jacket is compression extruded.

* * * * *